(12) United States Patent
Yang et al.

(10) Patent No.: US 12,061,374 B2
(45) Date of Patent: Aug. 13, 2024

(54) CAMERA ASSEMBLY AND USER EQUIPMENT

(71) Applicant: HUAWEI TECHNOLOGIES CO., LTD., Guangdong (CN)

(72) Inventors: Chuan Yang, Dongguan (CN); Li-Te Kuo, Dongguan (CN); Ming Zhou, Shenzhen (CN); Liang Li, Dongguan (CN); Qianyan Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 443 days.

(21) Appl. No.: 17/360,829

(22) Filed: Jun. 28, 2021

(65) Prior Publication Data

US 2021/0325630 A1    Oct. 21, 2021

Related U.S. Application Data

(63) Continuation of application No. PCT/CN2019/126465, filed on Dec. 19, 2019.

(30) Foreign Application Priority Data

Dec. 27, 2018  (CN) .......................... 201811610893.6
Dec. 27, 2018  (CN) .......................... 201822222714.3
(Continued)

(51) Int. Cl.
*G02B 7/09* (2021.01)
*G02B 7/02* (2021.01)
(Continued)

(52) U.S. Cl.
CPC ............... *G02B 7/09* (2013.01); *G02B 7/021* (2013.01); *G02B 27/646* (2013.01); *G03B 5/00* (2013.01);
(Continued)

(58) Field of Classification Search
CPC ........ G02B 7/09; G02B 7/021; G02B 27/646; G03B 5/00; G03B 13/36;
(Continued)

(56) References Cited

U.S. PATENT DOCUMENTS

| | | |
|---|---|---|
| 2008/0203512 A1 | 8/2008 | Webster et al. |
| 2011/0102920 A1 | 5/2011 | Shyu et al. |
| 2013/0002933 A1* | 1/2013 | Topliss .................... F03G 7/065 |
| | | 310/306 |

FOREIGN PATENT DOCUMENTS

| | | |
|---|---|---|
| CN | 204215089 U | 3/2015 |
| CN | 104993668 A | 10/2015 |
| | (Continued) | |

*Primary Examiner* — Yogesh K Aggarwal
(74) *Attorney, Agent, or Firm* — HUAWEI TECHNOLOGIES CO., LTD.

(57) ABSTRACT

A camera assembly and a mobile terminal comprise an optical image stabilization motor with relatively large electromagnetic radiation, for example, a SMA motor. The SMA motor could be disposed on a lighting side of the lens assembly. Because an image sensor is located on an imaging side of the lens assembly, this can achieve a relatively long physical distance between the SMA motor and the image sensor, thereby reducing electromagnetic interference caused by the SMA motor to the image sensor.

26 Claims, 6 Drawing Sheets

(30) Foreign Application Priority Data

Mar. 13, 2019 (CN) .......................... 201910189140.0
Mar. 13, 2019 (CN) .......................... 201920318659.X

(51) Int. Cl.
　　　*G02B 27/64*　　　(2006.01)
　　　*G03B 5/00* 　　　 (2021.01)
　　　*G03B 13/36* 　　 (2021.01)
　　　*H04N 23/51* 　　 (2023.01)
　　　*H04N 23/52* 　　 (2023.01)
　　　*H04N 23/54* 　　 (2023.01)
　　　*H04N 23/55* 　　 (2023.01)
　　　*H04N 23/68* 　　 (2023.01)

(52) U.S. Cl.
　　　CPC ............. *G03B 13/36* (2013.01); *H04N 23/51* (2023.01); *H04N 23/52* (2023.01); *H04N 23/54* (2023.01); *H04N 23/55* (2023.01); *H04N 23/687* (2023.01); *G03B 2205/0007* (2013.01)

(58) Field of Classification Search
　　　CPC ........... G03B 2205/0007; H04N 23/51; H04N 23/52; H04N 23/54; H04N 23/55; H04N 23/687; H04N 23/57; H04N 23/60; H04N 23/685; H04M 1/0264
　　　See application file for complete search history.

(56) References Cited

FOREIGN PATENT DOCUMENTS

| | | | |
|---|---|---|---|
| CN | 105093473 | A | 11/2015 |
| CN | 106572284 | A | 4/2017 |
| CN | 206402020 | U | 8/2017 |
| CN | 207037194 | U | 2/2018 |
| CN | 108153081 | A | 6/2018 |
| KR | 20130124620 | * | 11/2013 |
| KR | 20130124620 | A | 11/2013 |
| KR | 20150000182 | A | 1/2015 |

\* cited by examiner

CAMERA ASSEMBLY AND USER EQUIPMENT

CROSS-REFERENCE TO RELATED APPLICATIONS

This application is a continuation of International Application No. PCT/CN2019/126465, filed on Dec. 19, 2019, which claims priority to Chinese Patent Application No. 201811610893.6, filed on Dec. 27, 2018 and Chinese Patent Application No. 201822222714.3, filed on Dec. 27, 2018 and Chinese Patent Application No. 201910189140.0, filed on Mar. 13, 2019 and Chinese Patent Application No. 201920318659.X, filed on Mar. 13, 2019. The disclosures of the aforementioned applications are hereby incorporated by reference in their entireties.

TECHNICAL FIELD

This application relates to the field of electronic and communications technologies, and in particular, to the field of optical imaging technologies.

BACKGROUND

To improve picture quality during photographing by a camera of a mobile terminal, an optical image stabilization (OIS) technology may be used in the camera to perform motion compensation on shaking of the camera.

An optical image stabilization component with an optical image stabilization motor in a mobile terminal (for example, a mobile phone) performs shaking detection by using a gyroscope inside the mobile terminal, and then moves a lens assembly in an opposite direction by using the optical image stabilization motor, to compensate for an image blur phenomenon caused by shaking of the mobile terminal during exposure. However, during operating of the optical image stabilization motor, an electrical signal, such as a pulse width modulation (PWM) signal, that is input to a SMA wire causes interference to an image sensor. As a result, a stripe exists on a picture photographed by the image sensor, affecting a photographing effect of the camera.

SUMMARY

This application provides a camera assembly and user equipment, so that an image sensor is subject to relatively small interference, and image quality is relatively good.

According to a first aspect, this application provides an embodiment of a camera assembly, including an optical image stabilization motor, a housing, and a lens assembly; the optical image stabilization motor and the lens assembly are located inside the housing; a through hole is provided at an end of the housing; the lens assembly collects light through the through hole; the optical image stabilization motor is located on an inner side at the end that is of the housing and at which the through hole is provided; the optical image stabilization motor is configured to drive the lens assembly to perform compensation displacement; and the compensation displacement is used to compensate for displacement that occurs when the lens assembly shakes.

According to the solution in this application, an imaging problem caused by impact of electromagnetic radiation of the optical image stabilization motor on an image sensor can be greatly reduced, thereby improving imaging quality.

In an embodiment of the camera assembly (this embodiment may be combined with any one or more of the foregoing embodiments of the camera assembly), the camera assembly further includes an image sensor. The image sensor is configured to collect light passing through the lens assembly and form an image. The image sensor is located inside the housing and is located at an end opposite to the through hole.

In an embodiment of the camera assembly (this embodiment may be combined with any one or more of the foregoing embodiments of the camera assembly), the optical image stabilization motor may be any motor that causes electromagnetic interference to the image sensor.

In an embodiment of the camera assembly (this embodiment may be combined with any one or more of the foregoing embodiments of the camera assembly), the optical image stabilization motor includes a non-movable image stabilization component, a movable image stabilization component, and a drive wire connected between the non-movable image stabilization component and the movable image stabilization component; the non-movable image stabilization component is connected to the inner side at the end that is of the housing and at which the through hole is provided; the drive wire is configured to drive the movable image stabilization component to perform compensation displacement; and the movable image stabilization component is configured to drive the lens assembly to perform compensation displacement.

In an embodiment of the camera assembly (this embodiment may be combined with any one or more of the foregoing embodiments of the camera assembly), the non-movable image stabilization component and the movable image stabilization component of the optical image stabilization motor each may be disposed as a plate structure with a via, and the movable image stabilization component and the non-movable image stabilization component are stacked.

In an embodiment of the camera assembly (the embodiment may be combined with any one or more of the foregoing embodiments of the camera assembly), the housing includes an end plate and a side plate connected to an edge of the end plate, and the through hole is provided on the end plate.

In an embodiment of the camera assembly (this embodiment may be combined with any one or more of the foregoing embodiments of the camera assembly), the non-movable image stabilization component of the optical image stabilization motor is non-movably connected to an inner side wall at the end that is of the housing and at which the through hole is provided, or the non-movable image stabilization component of the optical image stabilization motor is movably connected to an inner side wall at the end that is of the housing and at which the through hole is provided. The movable image stabilization component is located on an inner side of the non-movable image stabilization component. A via of the movable image stabilization component overlaps a via of the non-movable image stabilization component. The via of the movable image stabilization component and the via of the non-movable image stabilization component may also overlap the through hole of the housing. In this way, neither the movable image stabilization component nor the non-movable image stabilization component blocks light entering the lens assembly, and the lens assembly may pass through the via of the movable image stabilization component and the via of the non-movable image stabilization component during movement. Certainly, the lens assembly may also pass through the through hole of the housing during movement.

In an embodiment of the camera assembly (this embodiment may be combined with any one or more of the foregoing embodiments of the camera assembly), the drive wire may be connected between opposite side surfaces of the non-movable image stabilization component and the movable image stabilization component.

In an embodiment of the camera assembly (this embodiment may be combined with any one or more of the foregoing embodiments of the camera assembly), a supporting spring plate or spring may be further connected between the opposite side surfaces of the non-movable image stabilization component and the movable image stabilization component.

The supporting spring plate or spring connected between the non-movable image stabilization component and the movable image stabilization component is configured to facilitate movement of the movable image stabilization component relative to the non-movable image stabilization component, and limit a movement distance of the movable image stabilization component relative to the non-movable image stabilization component.

In an embodiment of the camera assembly (this embodiment may be combined with any one or more of the foregoing embodiments of the camera assembly), the non-movable image stabilization component of the optical image stabilization motor is non-movably connected to an inner side wall at the end that is of the housing and at which the through hole is provided. Specifically, the non-movable image stabilization component of the optical image stabilization motor is non-movably connected to an inner side wall of the end plate, or the non-movable image stabilization component of the optical image stabilization motor is non-movably connected to an inner side wall at an end that is of the side plate and that is near the end plate.

In an embodiment of the camera assembly (this embodiment may be combined with any one or more of the foregoing embodiments of the camera assembly), the non-movable image stabilization component of the optical image stabilization motor is movably connected to an inner side wall at the end that is of the housing and at which the through hole is provided. Specifically, the non-movable image stabilization component of the optical image stabilization motor is movably connected to an inner side wall of the end plate, or the non-movable image stabilization component of the optical image stabilization motor is movably connected to an inner side wall at an end that is of the side plate and that is near the end plate. For example, the non-movable image stabilization component of the optical image stabilization motor is movably connected to the inner side wall of the end plate by using a supporting spring plate or spring; or the non-movable image stabilization component of the optical image stabilization motor is movably connected, by using a supporting spring plate or spring, to the inner side wall at the end that is of the side plate and that is near the end plate.

In an embodiment of the camera assembly (the embodiment may be combined with any one or more of the foregoing embodiments of the camera assembly), the housing further includes a base plate. The base plate is connected to an edge of the side plate, and is located at an end opposite to the end plate.

In an embodiment of the camera assembly (this embodiment may be combined with any one or more of the foregoing embodiments of the camera assembly), the camera assembly may further include a circuit board, and the image sensor may be disposed on the circuit board. The circuit board is located on an imaging side of the lens assembly, and the circuit board is located at an end that is of the housing and that is opposite to the end plate.

In an embodiment of the camera assembly (this embodiment may be combined with any one or more of the foregoing embodiments of the camera assembly), the circuit board may be disposed on an inner side of the base plate. Alternatively, the circuit board may be located on an outer side of the base plate, and an outlet is provided in front of the image sensor on the base plate. After passing through the lens assembly, external light passes through the outlet and is irradiated on the image sensor.

In an embodiment of the camera assembly (this embodiment may be combined with any one or more of the foregoing embodiments of the camera assembly), the circuit board may be used as the base plate of the housing. In this way, no additional base plate needs to be disposed, so that a structure of the camera assembly is simpler.

In an embodiment of the camera assembly (which may be combined with any one or more of the foregoing embodiments of the camera assembly), in an embodiment of the camera assembly, the lens assembly includes a lens holder and one or more optical lenses mounted inside the lens holder.

In an embodiment of the camera assembly (this embodiment may be combined with any one or more of the foregoing embodiments of the camera assembly), the camera assembly further includes a focusing motor. The focusing motor is configured to drive the lens assembly to move to implement focusing. The focusing motor is located inside the housing, and is located between the base plate and the optical image stabilization motor or is located between the circuit board and the optical image stabilization motor. Electromagnetic interference caused by the focusing motor to the image sensor is smaller than electromagnetic interference caused by the optical image stabilization motor to the image sensor. The focusing motor may be a voice coil motor (VCM) or a piezoelectric motor. The focusing motor may drive the lens assembly to move along a direction of an optical axis or along a direction parallel to the optical axis, to implement focusing.

In an embodiment of the camera assembly (this embodiment may be combined with any one or more of the foregoing embodiments of the camera assembly), the side plate of the housing is located in space around the focusing motor. A supporting spring plate or spring is connected between the focusing motor and the side plate or the base plate of the housing. The supporting spring plate or spring is configured to support and limit the focusing motor, to reduce unnecessary rotation or swinging of the focusing motor.

In an embodiment of the camera assembly (this embodiment may be combined with any one or more of the foregoing embodiments of the camera assembly), a first lead is connected between the drive wire of the optical image stabilization motor and the circuit board. The first lead is a conducting wire for transmitting a signal between the optical image stabilization motor and the circuit board. The circuit board outputs an electrical signal (for example, a PWM signal) to the drive wire through the first lead.

In an embodiment of the camera assembly (this embodiment may be combined with any one or more of the foregoing embodiments of the camera assembly), the first lead is connected to the circuit board along an outer side of the side plate of the housing. The first lead may be electrically connected to the circuit board through welding with the circuit board, or the first lead may be electrically connected to the circuit board by using a connector.

In an embodiment of the camera assembly (this embodiment may be combined with any one or more of the foregoing embodiments of the camera assembly), the image sensor is provided with a plurality of pins electrically connected to the circuit board. A location at which the first lead is electrically connected to the circuit board is a location far away from pins of the image sensor. This can reduce electromagnetic interference caused by an electrical signal in the first lead to the image sensor.

In an embodiment of the camera assembly (this embodiment may be combined with any one or more of the foregoing embodiments of the camera assembly), a second lead is connected between the focusing motor and the circuit board. The second lead is a conducting wire for transmitting a signal between the focusing motor and the circuit board. The second lead is connected from an outer side of the side plate of the housing to the circuit board. The second lead is electrically connected to the circuit board through welding with the circuit board, or the second lead is electrically connected to the circuit board by using a connector.

In an embodiment of the camera assembly (this embodiment may be combined with any one or more of the foregoing embodiments of the camera assembly), a location at which the second lead is electrically connected to the circuit board is a location far away from pins of the image sensor. For example, a location at which the second lead is welded with the circuit board is a location near a side edge that is of the image sensor and at which no pin is disposed. This can reduce electromagnetic interference caused to the image sensor by an electrical signal transmitted in the second lead.

In an embodiment of the camera assembly (this embodiment may be combined with any one or more of the foregoing embodiments of the camera assembly), when the circuit board is located on an outer side of the base plate, or the base plate is used as the base plate of the housing, at least a part of the circuit board is located on an outer side of the side plate. A location at which the first lead is connected to the circuit board is on an outer side of the side plate of the housing. This can reduce interference caused by an electrical signal in the first lead to the image sensor. A magnetic shielding material film may be attached to an inner side wall that is of the side plate of the housing and that is near the first lead, and the magnetic shielding material film is configured to shield electromagnetic radiation of an electrical signal in the first lead.

In an embodiment of the camera assembly (this embodiment may be combined with any one or more of the foregoing embodiments of the camera assembly), a location at which the second lead is connected to the circuit board may also be on an outer side of the side plate of the housing. A magnetic shielding material film may be attached to an inner side wall that is of the side plate of the housing and that is near the second lead, and the magnetic shielding material film is configured to shield electromagnetic radiation of an electrical signal in the second lead.

In an embodiment of the camera assembly (this embodiment may be combined with any one or more of the foregoing embodiments of the camera assembly), the second lead is connected from a drive component of the focusing motor to the non-movable image stabilization component of the optical image stabilization motor.

In an embodiment of the camera assembly (the embodiment may be combined with any one or more of the foregoing embodiments of the camera assembly), the first lead may pass through a hole (the hole may be the through hole, or may be a hole other than the through hole) or a gap provided on the side plate or the end plate of the housing to reach an outer side of the housing, and pass the outer side of the housing to reach the circuit board.

In an embodiment of the camera assembly (the embodiment may be combined with any one or more of the foregoing embodiments of the camera assembly), the second lead passes through a hole (the hole may be the through hole, or may be a hole other than the through hole) or a gap provided on the end plate or the side plate of the housing to reach an outer side of the housing, and pass the outer side of the housing to reach the circuit board.

In an embodiment of the camera assembly (this embodiment may be combined with any one or more of the foregoing embodiments of the camera assembly), the focusing motor includes a non-movable focusing component, a movable focusing component, and a drive component. The movable focusing component of the focusing motor is assembled with the lens assembly, or the movable focusing component of the focusing motor is integrated with the lens holder of the lens assembly. The non-movable focusing component of the focusing motor is disposed on an outer side of the movable focusing component. The movable image stabilization component of the optical image stabilization motor is movably connected to the movable focusing component of the focusing motor. The non-movable focusing component of the focusing motor is non-movably connected to the movable image stabilization component of the optical image stabilization motor, or the non-movable focusing component of the focusing motor is integrated with the movable image stabilization component of the optical image stabilization motor. The non-movable image stabilization component of the optical image stabilization motor is non-movably connected to an inner side wall of the end plate, or the non-movable image stabilization component of the optical image stabilization motor is non-movably connected to an inner side wall at an end that is of the side plate and that is near the end plate.

In an embodiment of the camera assembly (this embodiment may be combined with any one or more of the foregoing embodiments of the camera assembly), the drive component of the focusing motor is disposed between the non-movable focusing component and the movable focusing component of the focusing motor, and the drive component is configured to drive the movable focusing component to move, relative to the non-movable focusing component, along a direction of an optical axis or along a direction parallel to the optical axis.

In an embodiment of the camera assembly (this embodiment may be combined with any one or more of the foregoing embodiments of the camera assembly), the drive component includes a magnet and a coil. The second lead connects the drive component to the circuit board. Specifically, the second lead connects the coil to the circuit board.

In an embodiment of the camera assembly (this embodiment may be combined with any one or more of the foregoing embodiments of the camera assembly), the magnet is disposed on a side wall that is of the non-movable focusing component and that faces the movable focusing component, and the coil is mounted to a side wall that is of the movable focusing component and that faces the non-movable focusing component.

In an embodiment of the camera assembly (this embodiment may be combined with any one or more of the foregoing embodiments of the camera assembly), the movable focusing component may be of a tubular structure or a frame structure, and the movable focusing component of the tubular structure or the frame structure is sleeved on an outer side of the lens assembly.

In an embodiment of the camera assembly (this embodiment may be combined with any one or more of the foregoing embodiments of the camera assembly), the non-movable focusing component may also be disposed in a tubular structure or a frame structure, and the non-movable focusing component of the tubular structure or the frame structure is sleeved on an outer side of the movable focusing component.

In an embodiment of the camera assembly (this embodiment may be combined with any one or more of the foregoing embodiments of the camera assembly), when the movable image stabilization component and the non-movable image stabilization component of the optical image stabilization motor each are disposed as a plate structure with a via and are stacked, an end that is of the non-movable focusing component of the focusing motor and that faces the end plate of the housing is non-movably connected to the movable image stabilization component of the optical image stabilization motor, and an end that is of the movable focusing component of the focusing motor and that faces the end plate of the housing is movably connected to the movable image stabilization component of the optical image stabilization motor.

In an embodiment of the camera assembly (this embodiment may be combined with any one or more of the foregoing embodiments of the camera assembly), the supporting spring plate or spring between the focusing motor and the housing may be connected between the non-movable focusing component of the focusing motor and the side plate or the base plate of the housing.

In an embodiment of the camera assembly (this embodiment may be combined with any one or more of the foregoing embodiments of the camera assembly), the focusing motor includes a first movable component, a second movable component, and a drive component. The second movable component of the focusing motor is disposed in space around the lens assembly, and is assembled with the lens holder of the lens assembly, or the second movable component of the focusing motor is integrated with the lens holder of the lens assembly. The first movable component of the focusing motor is disposed on an outer side of the second movable component. The first movable component of the focusing motor is non-movably connected to the non-movable image stabilization component of the optical image stabilization motor, or the first movable component is integrated with the non-movable image stabilization component of the optical image stabilization motor. The movable image stabilization component of the optical image stabilization motor is non-movably connected to the second movable component of the focusing motor, or the movable image stabilization component of the optical image stabilization motor is integrated with the second movable component of the focusing motor. The non-movable image stabilization component of the optical image stabilization motor is movably connected to an inner side wall of the end plate of the housing, or the non-movable image stabilization component of the optical image stabilization motor is movably connected to an inner side wall at an end that is of the side plate of the housing and that is near the end plate.

In an embodiment of the camera assembly (this embodiment may be combined with any one or more of the foregoing embodiments of the camera assembly), the drive component of the focusing motor is disposed between the side plate of the housing and the focusing motor, and is configured to drive the focusing motor and the lens assembly to move, relative to the side plate, along a direction of an optical axis or along a direction parallel to the optical axis, to implement focusing. Correspondingly, the focusing motor is configured to drive the non-movable image stabilization component and the movable image stabilization component of the image stabilization motor to move along the direction of the optical axis or along the direction parallel to the optical axis.

In an embodiment of the camera assembly (this embodiment may be combined with any one or more of the foregoing embodiments of the camera assembly), the drive component includes a magnet and a coil.

In an embodiment of the camera assembly (this embodiment may be combined with any one or more of the foregoing embodiments of the camera assembly), the second lead connects the coil to the circuit board.

In an embodiment of the camera assembly (this embodiment may be combined with any one or more of the foregoing embodiments of the camera assembly), the first movable component is disposed opposite to the side plate of the housing, the magnet is disposed on an inner side that is of the side plate of the housing and that faces the first movable component, and the coil is mounted to a side wall that is of the first movable component and that faces the side plate.

In an embodiment of the camera assembly (the embodiment may be combined with any one or more of the foregoing embodiments of the camera assembly), the second movable component of the focusing motor may be of a tubular structure or a frame structure, and the second movable component of the tubular structure or the frame structure is sleeved on an outer side of the lens assembly.

In an embodiment of the camera assembly (this embodiment may be combined with any one or more of the foregoing embodiments of the camera assembly), the first movable component of the focusing motor may also be disposed in a tubular structure or a frame structure, and the first movable component of the tubular structure or the frame structure is sleeved on an outer side of the second movable component.

In an embodiment of the camera assembly (this embodiment may be combined with any one or more of the foregoing embodiments of the camera assembly), when the movable image stabilization component and the non-movable image stabilization component of the optical image stabilization motor are disposed as a plate structure with a via and are stacked, the non-movable image stabilization component is movably connected to an inner side wall of the end plate of the housing, or the non-movable image stabilization component is movably connected to an inner side wall at an end that is of the side plate of the housing and that is near the end plate. An edge of the non-movable image stabilization component stacked on the movable image stabilization component may protrude out of an edge of the movable image stabilization component. An end that is of the first movable component of the focusing motor and that faces the end plate of the housing is non-movably connected to an edge part that is of the non-movable image stabilization component and that protrudes out of the movable image stabilization component. An end that is of the second movable component of the focusing motor and that faces the end plate of the housing is movably connected to the movable image stabilization component. The movable image stabilization component is configured to drive the second movable component of the focusing motor to move, to perform compensation displacement. Correspondingly, the second movable component of the focusing motor is configured to drive the lens assembly to move, to perform compensation displacement.

In an embodiment of the camera assembly (this embodiment may be combined with any one or more of the foregoing embodiments of the camera assembly), the supporting spring plate or spring between the focusing motor and the housing may be connected between the first movable component of the focusing motor and the side plate or the base plate of the housing.

In an embodiment of the camera assembly (this embodiment may be combined with any one or more of the foregoing embodiments of the camera assembly), the compensation displacement compensates for displacement of the lens assembly during shaking, the shaking of the lens assembly is usually left-right shaking, and the compensation displacement is also located in a plane roughly perpendicular to the optical axis of the lens assembly. The plane roughly perpendicular to the optical axis is a plane whose included angle with the optical axis is a right angle, an acute angle less than 45 degrees, or an obtuse angle greater than 135 degrees. The compensation displacement is usually displacement in a direction roughly perpendicular to the optical axis of the lens assembly. The being roughly perpendicular means that an included angle between a straight line in which the displacement direction is located and a straight line in which the optical axis is located is a right angle, an acute angle less than 45 degrees, or an obtuse angle greater than 135 degrees.

In an embodiment of the camera assembly (this embodiment may be combined with any one or more of the foregoing embodiments of the camera assembly), the "non-movably connected" means that no relative displacement occurs after two components are connected.

In an embodiment of the camera assembly (this embodiment may be combined with any one or more of the foregoing embodiments of the camera assembly), the "movably connected" means that relative displacement may occur within a specific range after two components are connected.

According to a second aspect, this application provides user equipment, including a processor, a housing, and the camera assembly in the embodiments of the first aspect. The processor is located inside the housing, and the camera assembly is assembled on an inner inside of the housing. The processor is configured to send a control signal to the camera assembly.

In an embodiment of the camera assembly (this embodiment may be combined with any one or more of the foregoing embodiments of the camera assembly), the camera assembly may be non-movably or movably connected to a side wall of the housing. When the camera assembly is non-movably connected to the side wall of the housing, a light hole is provided in front of the camera assembly on the housing, and the camera assembly collects light through the light hole. When the camera assembly is movably connected to the side wall of the housing, the camera assembly is assembled on the inner side of the housing by using a scalable structure, and when photographing needs to be performed, the scalable structure pushes the camera assembly outside the housing.

In an embodiment of the camera assembly (the embodiment may be combined with any one or more of the foregoing embodiments of the camera assembly), a control signal and data may be transmitted between the processor and the camera assembly. The processor is configured to control the camera assembly to perform a photographing operation, and a picture photographed by the camera assembly may be transmitted to the processor.

In an embodiment of the camera assembly (the embodiment may be combined with any one or more of the foregoing embodiments of the camera assembly), a circuit board on which an image sensor in the camera assembly is located and a circuit board on which the processor is located may be different circuit boards. For example, the processor may be located on a primary circuit board, and the circuit board on which the image sensor in the camera assembly is located is electrically connected to the primary circuit board by using a conducting wire.

DESCRIPTION OF EMBODIMENTS

Figure 1:
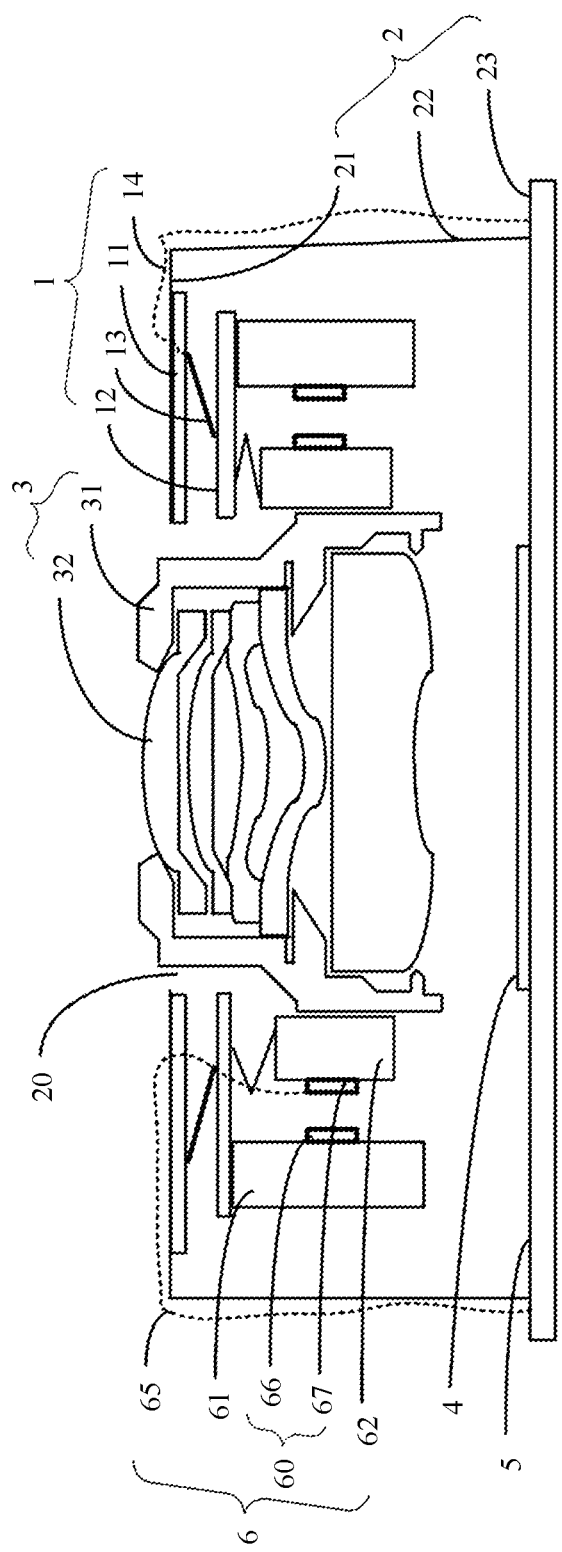
FIG. 1 is a schematic structural diagram of an embodiment of a camera assembly according to this application.

In this application, a camera assembly is mainly disposed in user equipment, so that the user equipment has photographing and video recording functions. To capture an external scene picture, the camera assembly usually includes a lens assembly, an auto-focus motor, an optical image stabilization motor, and the like. An image sensor is disposed at a location opposite to a tail end of the lens assembly.

Image sensor: The image sensor is a device that converts an optical signal into an electrical signal. Light passing through the lens assembly is irradiated on a photosensitive surface of the image sensor, and a photosensitive element on the photosensitive surface collects and records information such as light intensity of the light, to form an image. The image sensor may also be referred to as a picture sensor, a photosensitive chip, or a photosensitive element.

Lens assembly: The image sensor is located on an imaging side of the lens assembly. External light may be focused on the photosensitive surface of the image sensor by using the lens assembly, to form a clear image. Specifically, the photosensitive surface of the image sensor may be perpendicular to an optical axis of the lens assembly. A function of the lens assembly is to change a light path of light from the outside by using a refraction function of a lens, to focus an external scene picture on the image sensor. The lens assembly usually includes one or more transparent optical lenses (that is, lenses). These optical lenses are disposed at different locations along an axial direction of the lens assembly (that is, a direction of the optical axis of the lens assembly). When external light irradiated on the lens assembly moves forward along the optical axis of the lens assembly, refraction occurs when the light passes through different optical lenses, and finally, the light is focused on the photosensitive surface of the image sensor, so that the image sensor forms a clear image.

Focusing motor (for example, an auto-focus (auto focus, AF) motor): When the lens assembly implements imaging, because there are different distances between external objects and the lens assembly, when external objects at different distances are photographed, a distance (that is, an image distance) between an optical lens and the image sensor of the lens assembly usually needs to be adjusted, to ensure that a picture can be properly focused on the image sensor. The auto-focus motor can drive some or all lenses in the lens assembly to move forward and backward along the direction of the optical axis of the lens assembly, to ensure that light of an external object can be focused on the image sensor after passing through the lens assembly, to form a clear image. The auto-focus motor may be of a ring or frame structure, and is disposed around an outer circumferential side of the lens assembly. In this way, when the auto-focus motor drives a lens in the lens assembly to move, light transmission of the lens assembly is not affected.

Optical image stabilization (Optical Image Stabilization, OIS) motor: In a handheld photographing manner, the camera assembly may shake due to unsteady holding by a hand, and the lens assembly inside the camera assembly also shakes accordingly. As a result, an imaging picture of the lens assembly jitters. The optical image stabilization motor is directly or indirectly connected to the lens assembly, and controls a reverse motion of the lens assembly to compensate for shaking of the camera assembly. Specifically, a hand vibration may be detected by using a sensor such as a gyro sensor, and is converted into an electrical signal. A processed signal controls the optical image stabilization motor to move in parallel to the photosensitive surface of the image sensor, to cancel imaging deviation and jitter phenomena caused by the hand vibration. Usually, the optical image stabilization motor may also be sleeved on an outer circumferential side of the lens assembly, to avoid affecting normal light transmission of the lens assembly.

Drive wire: When the optical image stabilization motor is a SMA (Shape Memory Alloy) motor, a drive wire of the SMA motor may be made of a shape memory alloy (SMA) material, and therefore may also be referred to as a SMA wire. When an electrical signal is input to the drive wire, compared with a state when no electrical signal is input, temperature changes, and a length of the drive wire also changes accordingly. When the length of the drive wire changes, a movable component of the optical image stabilization motor may be driven to perform displacement relative to a non-movable component. For example, a length of some drive wires in a conductive state is shorter than a length of the drive wires in a non-conductive state. In other words, the drive wires shrink in the conductive state. The electrical signal input to the drive wire may be a PWM (Pulse Width Modulation, pulse width modulation) signal. The PWM signal is a high-frequency pulse signal, and generates relatively large electromagnetic wave radiation. The electromagnetic wave radiation causes relatively strong interference to a circuit in the image sensor.

The foregoing describes various components in the embodiments of the camera assembly in this application, to facilitate understanding by a person skilled in the art. It should be noted that the components listed above are not components that must be included in the camera assembly in this application.

According to the camera assembly provided in this application, the optical image stabilization motor is disposed on a lighting side of the lens assembly, so that the optical image stabilization motor is far away from the image sensor, and there is a relatively long physical distance between the optical image stabilization motor and the image sensor. Therefore, electromagnetic interference caused by the optical image stabilization motor to the image sensor is reduced. In addition, this manner is simple and easy to implement, has a low material costs and a simple assembly process, and facilitates mass production.

A design solution of the camera assembly in this application may be applied to user equipment with two or more camera assemblies, to improve photographing experience of a user. In addition, the design solution of the camera assembly in this application may be applied to a periscope camera module. An optical image stabilization motor in the periscope camera module is usually a SMA motor.

The following describes various embodiments of the camera assembly provided in this application. Reference signs of components in the figures are as follows an optical image stabilization motor 1, a non-movable image stabilization component 11, a movable image stabilization component 12, a drive wire 13, a first lead 14, a housing 2, a through hole 20, an end plate 21, a side plate 22, a base plate 23, a lens assembly 3, a lens holder 31, an optical lens 32, an image sensor 4, pins 41, a circuit board 5, a focusing motor 6, a non-movable focusing component 61, a movable focusing component 62, a drive component 60, a first movable component 63, a second movable component 64, a second lead 65, a magnet 66, a coil 67, and a spring plate 7.

As shown in FIG. 1 to FIG. 4, the camera assembly provided in this application includes an optical image stabilization motor 1, a housing 2, and a lens assembly 3. The optical image stabilization motor 1 and the lens assembly 3 are located inside the housing 2. A through hole 20 is provided at an end of the housing 2. The lens assembly 3 collects light through the through hole 20. The optical image stabilization motor 1 is located on an inner side at the end that is of the housing 2 and at which the through hole 20 is provided. The optical image stabilization motor 1 is configured to drive the lens assembly 3 to perform compensation displacement. The compensation displacement is used to compensate for displacement that occurs when the lens assembly 3 shakes.

In a specific embodiment, the camera assembly further includes an image sensor 4, and the image sensor is configured to collect light passing through the lens assembly 3 and form an image. The image sensor 4 is located inside the housing 2 and is located at an end opposite to the through hole 20.

In a specific embodiment, the optical image stabilization motor 1 may be any motor that causes electromagnetic interference to the image sensor 4. For example, the optical image stabilization motor may be a SMA motor or a piezoelectric motor. When the optical image stabilization motor is a SMA motor, according to the solution in this application, stripe noise generated due to impact of a PWM signal of the SMA motor on the image sensor can be greatly reduced, thereby improving imaging quality.

Figure 3:
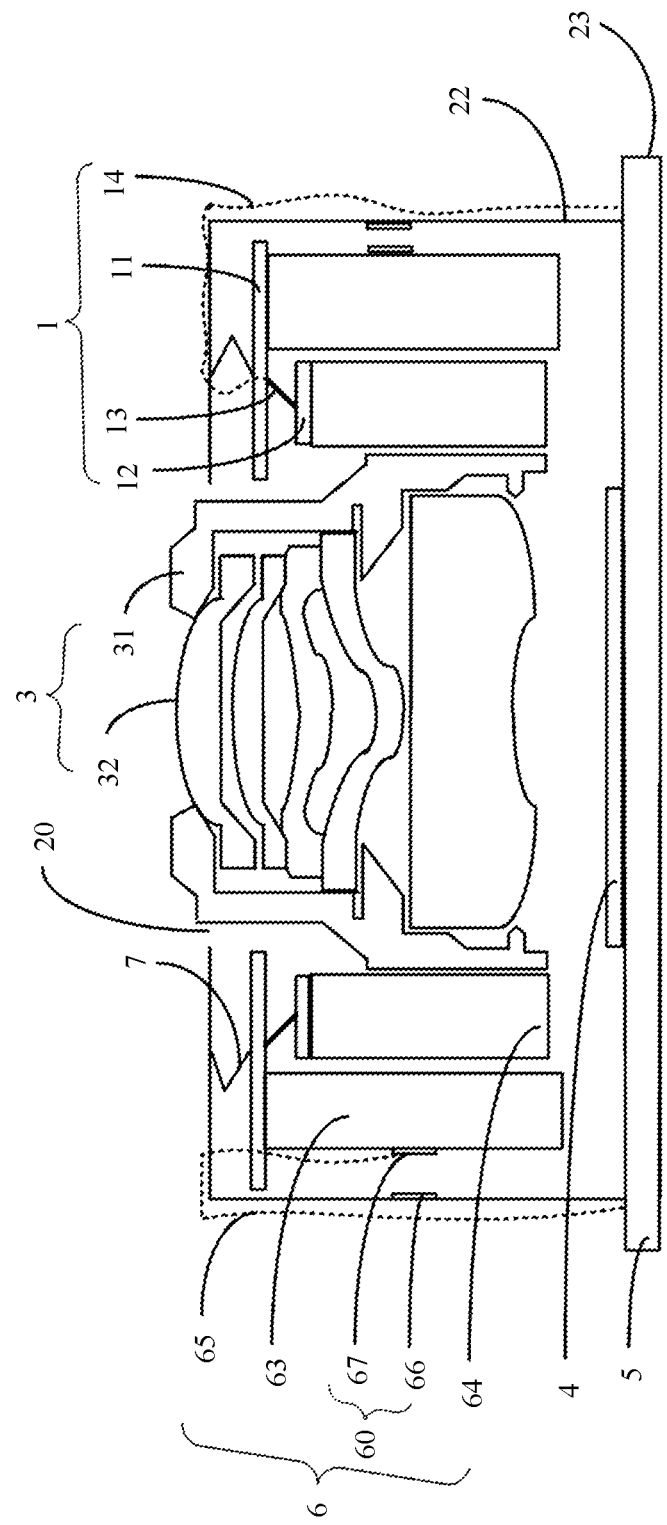
FIG. 3 is a schematic structural diagram of an embodiment of another camera assembly according to this application.

As shown in FIG. 1 and FIG. 3, the optical image stabilization motor 1 includes a non-movable image stabilization component 11, a movable image stabilization component 12, and a drive wire 13 connected between the non-movable image stabilization component 11 and the movable image stabilization component 12. The non-movable image stabilization component 11 is connected to the inner side of the end that is of the housing 2 and at which the through hole 20 is provided. The drive wire 13 is configured to drive the movable image stabilization component 12 to perform compensation displacement. The movable image stabilization component 12 is configured to drive the lens assembly 3 to perform compensation displacement.

As shown in FIG. 1 to FIG. 4, the non-movable image stabilization component 11 and the movable image stabilization component 12 of the optical image stabilization motor 1 each may be disposed as a plate structure with a via, and the movable image stabilization component 11 and the non-movable image stabilization component 12 are stacked.

As shown in FIG. 1 or FIG. 3, the housing 2 includes an end plate 21 and a side plate 22 connected to an edge of the end plate 21, and the through hole 20 is provided on the end plate 21.

As shown in FIG. 1 to FIG. 4, the non-movable image stabilization component 11 of the optical image stabilization motor 1 is non-movably connected to an inner side wall at the end that is of the housing 2 and at which the through hole 20 is provided, or the non-movable image stabilization component 11 of the optical image stabilization motor 1 is movably connected to an inner side wall at the end that is of the housing 2 and at which the through hole 20 is provided. The movable image stabilization component 12 is located on an inner side of the non-movable image stabilization component 11. A via of the movable image stabilization component 12 overlaps a via of the non-movable image stabilization component 11. The via of the movable image stabilization component 12 and the via of the non-movable image stabilization component 11 may also overlap the through hole 20 of the housing 2. In this way, neither the movable image stabilization component 12 nor the non-movable image stabilization component 11 blocks light entering the lens assembly 3, and the lens assembly 3 may pass through the via of the movable image stabilization component 12 and the via of the non-movable image stabilization component 11 during movement. Certainly, the lens assembly 3 may also pass through the through hole 20 of the housing 2 during movement.

As shown in FIG. 1 or FIG. 3, the drive wire 13 may be connected between opposite side surfaces of the non-movable image stabilization component 11 and the movable image stabilization component 12. A supporting spring plate or spring may be further connected between the opposite side surfaces of the non-movable image stabilization component 11 and the movable image stabilization component 12. The supporting spring plate or spring connected between the non-movable image stabilization component 11 and the movable image stabilization component 12 is configured to facilitate movement of the movable image stabilization component 12 relative to the non-movable image stabilization component 11, and limit a movement distance of the movable image stabilization component 12 relative to the non-movable image stabilization component 11. Certainly, the supporting spring plate or spring may be alternatively disposed at another location, provided that the supporting spring plate or spring can support the movable image stabilization component 12 and the lens assembly 3.

In an embodiment of the optical image stabilization motor 1, the non-movable image stabilization component 11 of the optical image stabilization motor 1 is non-movably connected to an inner side wall at the end that is of the housing 2 and at which the through hole 20 is provided. Specifically, the non-movable image stabilization component 11 of the optical image stabilization motor 1 is non-movably connected to an inner side wall of the end plate 21, or the non-movable image stabilization component 11 of the optical image stabilization motor 1 is non-movably connected to an inner side wall at an end that is of the side plate 22 and that is near the end plate 21.

As shown in FIG. 1 or FIG. 3, in another embodiment of the optical image stabilization motor 1, the non-movable image stabilization component 11 of the optical image stabilization motor 1 is movably connected to an inner side wall at the end that is of the housing 2 and at which the through hole 20 is provided. Specifically, the non-movable image stabilization component 11 of the optical image stabilization motor 1 is movably connected to an inner side wall of the end plate 21, or the non-movable image stabilization component 11 of the optical image stabilization motor 1 is movably connected to an inner side wall at an end that is of the side plate 22 and that is near the end plate 21. For example, the non-movable image stabilization component 11 of the optical image stabilization motor 1 is movably connected to the inner side wall of the end plate 21 by using a supporting spring plate or spring 7; or the non-movable image stabilization component 11 of the optical image stabilization motor 1 is movably connected, by using a supporting spring plate or spring, to the inner side wall at the end that is of the side plate 22 and that is near the end plate 21.

In an embodiment of the camera assembly, the housing 2 further includes a base plate 23. The base plate 23 is connected to an edge of the side plate 22, and is located at an end opposite to the end plate 21.

As shown in FIG. 1 or FIG. 3, in an embodiment of the camera assembly, the camera assembly may further include a circuit board 5, and the image sensor 4 may be disposed on the circuit board 5. The circuit board 5 is located on an imaging side of the lens assembly 3, and the circuit board 5 is located at an end that is of the housing 2 and that is opposite to the end plate 21. The circuit board 5 may be disposed on an inner side of the base plate 23. Alternatively, the circuit board 5 may be located on an outer side of the base plate 23, and an outlet is provided in front of the image sensor 4 on the base plate 23. After passing through the lens assembly 3, external light passes through the outlet and is irradiated on the image sensor 4.

For simplicity, the circuit board 5 may be used as the base plate 23 of the housing 2. In this way, no additional base plate needs to be disposed.

As shown in FIG. 1 or FIG. 3, in an embodiment of the camera assembly, the lens assembly 3 includes a lens holder 31 and one or more optical lenses 32 mounted inside the lens holder 31.

As shown in FIG. 1 or FIG. 3, in an embodiment of the camera assembly, the camera assembly further includes a focusing motor 6. The focusing motor 6 is configured to drive the lens assembly 3 to move to implement focusing. The focusing motor 6 is located inside the housing 2, and is located between the base plate 23 (or the circuit board 5) and the optical image stabilization motor 1. Electromagnetic interference caused by the focusing motor 6 to the image sensor 4 is smaller than electromagnetic interference caused by the optical image stabilization motor 1 to the image sensor 4. The focusing motor 6 may be a voice coil motor (Voice Coil Motor, VCM) or a piezoelectric motor. The focusing motor 6 may drive the lens assembly 3 to move along a direction of an optical axis or along a direction parallel to the optical axis, to implement focusing.

Figure 5:
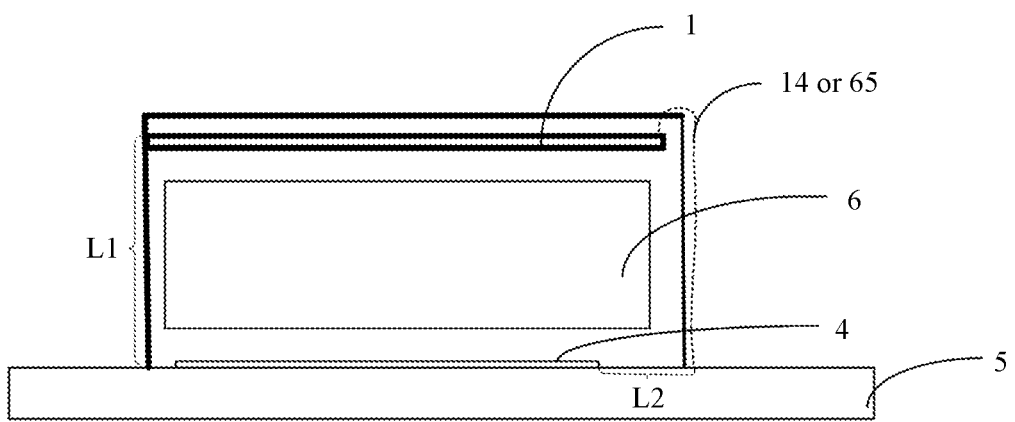
FIG. 5 is a schematic diagram of a distance between an optical image stabilization motor and an image sensor, and a distance between a first lead and the image sensor in an embodiment of a camera assembly according to this application.

As shown in FIG. 5, a distance between the optical image stabilization motor 1 and the circuit board 5 is L1.

The side plate 22 of the housing 2 is located in space around the focusing motor 6. A supporting spring plate or spring is connected between the focusing motor 6 and the side plate 22 or the base plate 23 of the housing 2. The supporting spring plate or spring is configured to support and limit the focusing motor 6, to reduce unnecessary rotation or swinging of the focusing motor 6.

As shown in FIG. 1 or FIG. 3, in an embodiment of the camera assembly, a first lead 14 is connected between the drive wire 13 of the optical image stabilization motor 1 and the circuit board 5. The first lead 14 is a conducting wire for transmitting a signal between the optical image stabilization motor 1 and the circuit board 5. The circuit board 5 outputs an electrical signal (for example, a PWM signal) to the drive wire 13 through the first lead 14.

The first lead 14 is connected to the circuit board 5 along an outer side of the side plate 22 of the housing 2. The first lead 14 may be electrically connected to the circuit board 5 through welding with the circuit board 5, or the first lead 14 may be electrically connected to the circuit board 5 by using a connector.

Figure 6:
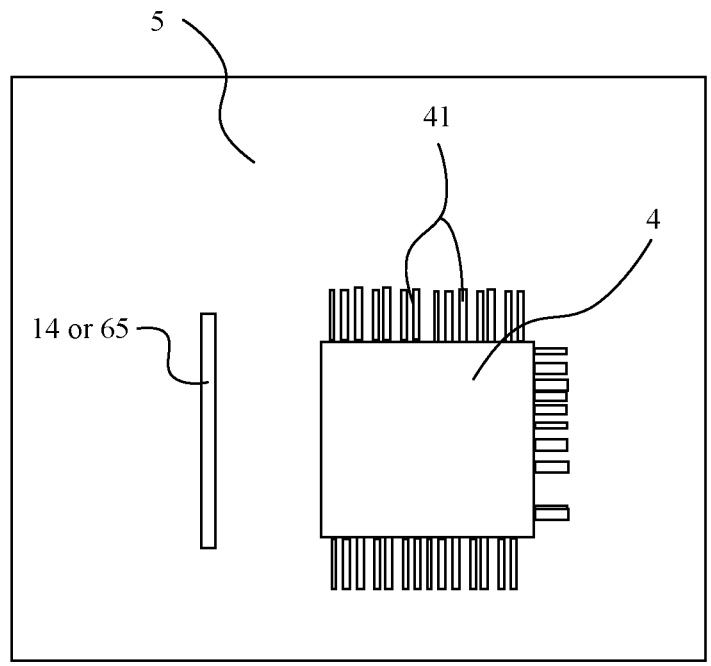
FIG. 6 is a schematic diagram of a relative location between a first pin or a second pin and an image sensor in an embodiment of a camera assembly according to this application.

As shown in FIG. 6, in an embodiment of the camera assembly, the image sensor 4 is provided with a plurality of pins electrically connected to the circuit board 5. To reduce electromagnetic interference caused by an electrical signal in the first lead 14 to the image sensor 4, a location at which the first lead 14 is electrically connected to the circuit board 5 is a location far away from pins of the image sensor 4. For example, for a rectangular image sensor 4, the pins 41 are located at one, two, or three side edges of the image sensor 4. There is at least one side edge of the image sensor 4 at which no pin is disposed. The location at which the first lead 14 is connected to the circuit board 5 is a location near a side edge that is of the image sensor 4 and on which no pin 41 is disposed. For example, the pins 41 are disposed at one or two shorter side edges of the rectangular image sensor 4, and the location at which the first lead 14 is connected to the circuit board 5 is near a longer side edge of the image sensor 4.

The first lead 14 is electrically connected to the circuit board, but the first lead 14 does not need to be electrically connected to the image sensor 4. It is preferred that the first lead 14 is away from the image sensor 4 as far as possible. Likewise, it is preferred that the first lead 14 is away from the pins 41 of the image sensor 4 as far as possible.

As shown in FIG. 1 or FIG. 3, a second lead 65 is connected between the focusing motor 6 and the circuit board 5. The second lead 65 is a conducting wire for transmitting a signal between the focusing motor 6 and the circuit board 5. The second lead 65 is connected from an outer side of the side plate 22 of the housing 2 to the circuit board 5. The second lead 65 is electrically connected to the circuit board 5 through welding with the circuit board 5, or the second lead 65 is electrically connected to the circuit board 5 by using a connector.

To reduce electromagnetic interference caused by an electrical signal transmitted in the second lead 65 to the image sensor 4, similar to the case with the first lead 14, a location at which the second lead 65 is electrically connected to the circuit board 5 is a location far away from the pins 41 of the image sensor 4. For example, a location at which the second lead 65 is welded with the circuit board 5 is a location near a side edge that is of the image sensor 4 and at which no pin 41 is disposed.

The second lead 65 does not need to be electrically connected to the image sensor 4. The second lead 65 is electrically connected to the circuit board 5. It is preferred that the second lead 65 is away from the image sensor 4 as far as possible. Likewise, it is preferred that the second lead 65 is away from the pins 41 of the image sensor 4 as far as possible. By limiting the location at which the first lead 14 is connected to the circuit board 5 and the location at which the second lead 65 is connected to the circuit board 5 to a location away from the pins 41 of the image sensor 4, interference caused by an electrical signal in the first lead 14 and the second lead 65 to the image sensor 4 can be reduced, thereby reducing stripe noise in the image formed by the image sensor 4.

As shown in FIG. 5, a distance between the first lead 14 (or the second lead 65) and the circuit board 5 is L2.

When the circuit board 5 is located on an outer side of the base plate 23, or the base plate 23 is used as the base plate 23 of the housing 2 (referring to FIG. 1 or FIG. 3), at least a part of the circuit board 5 is located on an outer side of the side plate 22. The location at which the first lead 14 is connected to the circuit board 5 is on an outer side of the side plate 22 of the housing 2. This can reduce interference caused by an electrical signal in the first lead 14 to the image sensor 4. A magnetic shielding material film may be attached to an inner side wall that is of the side plate 22 of the housing 2 and that is near the first lead 14, and the magnetic shielding material film is configured to shield electromagnetic radiation of an electrical signal in the first lead 14.

Similarly, the location at which the first lead 65 is connected to the circuit board 5 may also be on an outer side of the side plate 22 of the housing 2. A magnetic shielding material film may be attached to an inner side wall that is of the side plate 22 of the housing 2 and that is near the second lead 65, and the magnetic shielding material film is configured to shield electromagnetic radiation of an electrical signal in the second lead 65.

In a specific embodiment, as shown in FIG. 1 or FIG. 3, the second lead 65 is connected from the drive component 60 of the focusing motor 6 to the non-movable image stabilization component 11 of the optical image stabilization motor 1. The first lead 14 may pass through a hole (the hole may be the through hole 20, or may be a hole other than the through hole 20) or a gap provided on the side plate 22 or the end plate 21 of the housing 2 to reach an outer side of the housing 2, and pass the outer side of the housing 2 to reach the circuit board 5. Similar to the first lead 14, the second lead 65 passes through a hole (the hole may be the through hole 20, or may be a hole other than the through hole 20) or a gap provided on the end plate 21 or the side plate 22 of the housing 2 to reach an outer side of the housing 2, and pass the outer side of the housing 2 to reach the circuit board 5.

For example, the first lead 14 may pass from a side of the supporting spring or spring plate between the non-movable image stabilization component 11 and the movable image stabilization component 12 of the optical image stabilization motor 1. The second lead 65 may also pass from a side of the supporting spring or spring plate between the non-movable image stabilization component 11 and the movable image stabilization component 12 of the optical image stabilization motor 1. The first lead 14 may be a flexible PCB, and the second lead 65 may also be a flexible PCB.

In FIG. 1 and FIG. 3, to distinguish the first lead 14 from the second lead 65, the first lead 14 and the second lead 65 are separately disposed on two sides of the housing 2. Actually, the first lead 14 and the second lead 65 may be located on one side of the housing 2, or even may be integrated.

Figure 2:
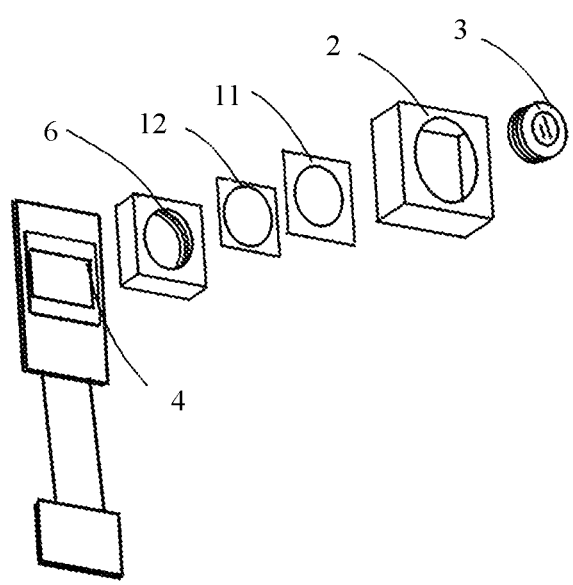
FIG. 2 is a schematic exploded view of components of the camera assembly shown in FIG. 1.

There are the following two embodiments for the focusing motor 6:

First embodiment: As shown in FIG. 1 and FIG. 2, the focusing motor 6 includes a non-movable focusing component 61, a movable focusing component 62, and a drive component 60. The non-movable image stabilization component 11 of the optical image stabilization motor 1 is non-movably connected to an inner side wall of the end plate 21, or the non-movable image stabilization component 11 of the optical image stabilization motor 1 is non-movably connected to an inner side wall at an end that is of the side plate 22 and that is near the end plate 21. The non-movable focusing component 61 of the focusing motor 6 is non-movably connected to the movable image stabilization component 12 of the optical image stabilization motor 1, or the non-movable focusing component 61 of the focusing motor 6 is integrated with the movable image stabilization component 12 of the optical image stabilization motor 1. The movable focusing component 62 of the focusing motor 6 is assembled with the lens assembly 3, or the movable focusing component 62 of the focusing motor 6 is integrated with the lens holder 31 of the lens assembly 3. The non-movable focusing component 61 of the focusing motor is disposed on an outer side of the movable focusing component 62. The movable image stabilization component 12 of the optical image stabilization motor 1 is movably connected to the movable focusing component 62 of the focusing motor 6.

When the drive wire 13 of the optical image stabilization motor 1 drives the movable image stabilization component 12 of the optical image stabilization motor 1 to move, the movable image stabilization component 12 of the optical image stabilization motor 1 drives the movable focusing component 62 and the non-movable focusing component 61 of the focusing motor 6 to move, and the movable focusing component 62 drives the lens assembly 3 to move, so that the lens assembly 3 performs compensation displacement.

In a specific embodiment, the drive component 60 of the focusing motor 6 is disposed between the non-movable focusing component 61 and the movable focusing component 62 of the focusing motor 6. The drive component 60 is configured to drive the movable focusing component 62 to move, relative to the focusing non-movable component 61, along a direction of the optical axis or along a direction parallel to the optical axis.

In a specific embodiment, the drive component 60 includes a magnet 66 and a coil 67. The second lead 65 connects the drive component 60 to the circuit board 5. Specifically, the second lead 65 connects the coil 67 to the circuit board 5.

In a specific embodiment, the movable focusing component 62 of the focusing motor 6 is disposed in space around the lens assembly 3, and is assembled with the lens assembly 3. The non-movable focusing component 61 is disposed on an outer side of the movable focusing component 62, and is disposed opposite to an outer side wall of the movable focusing component 62. The magnet 66 is disposed on a side wall that is of the non-movable focusing component 61 and that faces the movable focusing component 62. The coil 67 is mounted to a side wall that is of the movable focusing component 62 and that faces the non-movable focusing component 61. After being electrically connected, the coil 67 interacts with the magnet to generate a clockwise or anti-clockwise torque to push the movable focusing component 62 and the lens assembly 3 to rotate around the optical axis of the lens assembly 3. An outer side wall of the movable focusing component 62 may be movably connected to an inner side wall of the non-movable focusing component 61 in a threaded manner. In this way, when rotating around the optical axis, the lens assembly 3 moves along the direction of the optical axis or along a direction parallel to the optical axis, thereby implementing focusing.

In a specific embodiment, as shown in FIG. 2, the movable focusing component 62 may be of a tubular structure or a frame structure, and the movable focusing component of the tubular structure or the frame structure is sleeved on an outer side of the lens assembly 3.

The non-movable focusing component 61 may also be disposed in a tubular structure or a frame structure, and the non-movable focusing component 61 of the tubular structure or the frame structure is sleeved on an outer side of the movable focusing component 62.

In a specific embodiment, as shown in FIG. 1 and FIG. 2, when the movable image stabilization component 12 and the non-movable image stabilization component 11 of the optical image stabilization motor each are disposed as a plate structure with a via, an end that is of the non-movable focusing component 61 of the focusing motor and that faces the end plate 21 of the housing 2 is non-movably connected to the movable image stabilization component 12 of the optical image stabilization motor, and an end that is of the movable focusing component 62 of the focusing motor and that faces the end plate 21 of the housing 2 is movably connected to the movable image stabilization component 12 of the optical image stabilization motor 1. In this way, the movable image stabilization component 12 of the optical image stabilization motor 1 may drive the movable focusing component 62 and the non-movable focusing component 61 of the focusing motor 6 to move, and because the movable focusing component 62 of the focusing motor 6 is movably connected to the movable image stabilization component 12 of the optical image stabilization motor 1, the movable focusing component 62 of the focusing motor 6 may move relative to the non-movable focusing element 61 of the focusing motor and the movable image stabilization component 12 of the optical stabilization motor 1, to push the lens assembly 3 to focus.

A manner of movably connecting the movable image stabilization component 12 to the movable focusing component 62 may be connecting a spring or a spring plate between the movable image stabilization component 12 and the movable focusing component 62. In this way, the movable focusing component 62 may move relative to the movable image stabilization component 12, and the spring or the spring plate also limits a movement distance of the movable focusing component 62 relative to the movable image stabilization component 12.

The drive wire 13 of the optical image stabilization motor 1 is connected between the non-movable image stabilization component 11 and the movable image stabilization component 12 that are stacked. When the drive wire 13 is retracted, the movable image stabilization component 12 is driven to move in a direction roughly perpendicular to the optical axis of the lens assembly 3, the movable image stabilization component 12 drives the movable focusing component 62 and the non-movable focusing component 61 to move in a direction roughly perpendicular to the optical axis of the lens assembly 3, and the movable focusing component 62 drives the lens assembly 3 to move in a direction roughly perpendicular to the optical axis of the lens assembly 3, to compensate for displacement that occurs when the camera assembly shakes.

The supporting spring or spring plate between the focusing motor 6 and the housing 2 may be connected between the non-movable focusing component 61 of the focusing motor 6 and the side plate 22 or the base plate 23 of the housing 2. In addition, a supporting spring or spring plate may also be connected between the non-movable focusing component 61 and the movable focusing component 62. The supporting spring or spring plate between the non-movable focusing component 61 and the movable focusing component 62 is configured to limit a distance of relative movement between the non-movable focusing component 61 and the movable focusing component 62.

Figure 4:
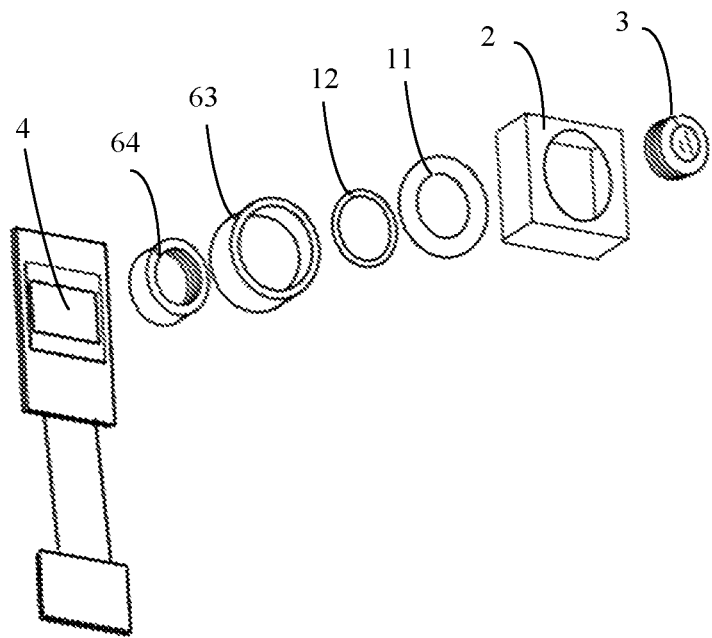
FIG. 4 is a schematic exploded view of components of the camera assembly shown in FIG. 3.

Second embodiment: As shown in FIG. 3 and FIG. 4, the focusing motor 6 includes a first movable component 63, a second movable component 64, and a drive component 60. The non-movable image stabilization component 11 of the optical image stabilization motor 1 is movably connected to an inner side wall of the end plate 21 of the housing 2, or the non-movable image stabilization component 11 of the optical image stabilization motor 1 is movably connected to an inner side wall of an end that is of the side plate 22 of the housing 2 and that is near the end plate 21.

The non-movable image stabilization component 11 of the optical image stabilization motor 1 may be movably connected to the housing 2 by disposing a spring or spring plate 7. The supporting spring or spring plate 7 between the non-movable image stabilization component 11 of the optical image stabilization motor 1 and the housing 2 is configured to limit a movement distance of the non-movable image stabilization component 11 of the optical image stabilization motor 1 when the non-movable image stabilization component 11 of the optical image stabilization motor 1 moves relative to the housing 2.

The first movable component 63 of the focusing motor 6 is non-movably connected to the non-movable image stabilization component 11 of the optical image stabilization motor 1, or the first movable component 63 is integrated with the non-movable image stabilization component 11 of the optical image stabilization motor 1. The second movable component 64 of the focusing motor 6 is disposed in space around the lens assembly 3, and is assembled with the lens holder 31 of the lens assembly 3, or the second movable component 64 of the focusing motor 6 is integrated with the lens holder 31 of the lens assembly 3. The first movable component 63 of the focusing motor 6 is disposed on an outer side of the second movable component 64. The movable image stabilization component 12 of the optical image stabilization motor 1 is non-movably connected to the second movable component 64 of the focusing motor 6, or the movable image stabilization component 12 of the optical image stabilization motor 1 is integrated with the second movable component 64 of the focusing motor 6.

When the drive wire 13 of the optical image stabilization motor 1 drives the movable image stabilization component 12 to move, the movable image stabilization component 12 drives the second movable component 64 of the focusing motor 6 to move, and the second movable component 64 of the focusing motor 6 drives the lens assembly 3 to move, so that the lens assembly 3 performs compensation displacement.

The drive component 60 of the focusing motor 6 is disposed between the side plate 22 of the housing 2 and the focusing motor 6, and is configured to drive the focusing motor 6 and the lens assembly 3 to move, relative to the side plate 22, along a direction of the optical axis or along a direction parallel to the optical axis, to implement focusing. Correspondingly, the focusing motor 6 also drives the non-movable image stabilization component 11 and the movable image stabilization component 12 of the image stabilization motor 1 to move along the direction of the optical axis or along the direction parallel to the optical axis.

In a specific embodiment, the drive component 60 includes a magnet 66 and a coil 67. The second lead 65 connects the drive component 60 to the circuit board 5. Specifically, the second lead 65 connects the coil 67 to the circuit board 5.

The first movable component 63 is disposed opposite to the side plate 22 of the housing 2. The magnet 66 is disposed on an inner side that is of the side plate 22 of the housing 2 and that faces the first movable component 63. The coil 67 is mounted to a side wall that is of the first movable component 63 and that faces the side plate 22. After being electrically connected, the coil 67 interacts with the magnet 66 to generate a clockwise or anti-clockwise torque to push the first movable component 63, the second movable component 64, the movable image stabilization component 12, the non-movable image stabilization component 11, and the lens assembly 3 to rotate around the optical axis of the lens assembly 3. An outer side wall of the first movable component 63 of the focusing motor 6 may be movably connected to an inner side wall of the side plate 22 of the housing 2 in a threaded manner. In this way, when rotating around the optical axis, the lens assembly 3 moves along the direction of the optical axis or along a direction parallel to the optical axis, thereby implementing focusing. Because the non-movable image stabilization component 11 is movably connected to the end plate 21 of the housing 2 (for example, movably connected by using a supporting spring or spring plate), the first movable component 63, the second movable component 64, the non-movable image stabilization component 11, and image stabilization component 12 may move relative to the housing 2, to push the lens assembly 3 to focus.

In a specific embodiment, as shown in FIG. 4, the second movable component 64 of the focusing motor 6 may be of a tubular structure or a frame structure, and the second movable component 64 of the tubular structure or the frame structure is sleeved on an outer side of the lens assembly 3.

The first movable component 63 of the focusing motor 6 may also be disposed in a tubular structure or a frame structure, and the first movable component 63 of the tubular structure or the frame structure is sleeved on an outer side of the second movable component 64.

In a specific embodiment, as shown in FIG. 3 and FIG. 4, when the movable image stabilization component 12 and the non-movable image stabilization component 11 of the optical image stabilization motor 1 each are disposed as a plate structure with a via, the non-movable image stabilization component 11 is movably connected to an inner side wall of the end plate 21 of the housing 2, or the non-movable image stabilization component 11 is movably connected to an inner side wall at an end that is of the side plate 22 of the housing 2 and that is near the end plate 21. An edge of the non-movable image stabilization component 11 stacked on the movable image stabilization component 12 may protrude out of an edge of the movable image stabilization component 12. An end that is of the first movable component 63 of the focusing motor 6 and that faces the end plate 21 of the housing 2 is non-movably connected to an edge part that is of the non-movable image stabilization component 11 and that protrudes out of the movable image stabilization component 12. An end that is of the second movable component 64 of the focusing motor 6 and that faces the end plate 21 of the housing 2 is movably connected to the movable image stabilization component 12. The movable image stabilization component 12 drives the second movable component 64 of the focusing motor 6 to move, to perform compensation displacement. Correspondingly, the second movable component 64 of the focusing motor 6 drives the lens assembly 3 to move, to perform compensation displacement.

The supporting spring or spring plate between the focusing motor 6 and the housing 2 may be connected between the first movable component 63 of the focusing motor 6 and the side plate 22 or the base plate 23 of the housing 2. In addition, a supporting spring or spring plate may also be connected between the first movable component 63 and the second movable component 64 of the focusing motor 6. The supporting spring or spring plate between the first movable component 63 and the second movable component 64 is configured to limit relative motion between the first movable component 63 and the second movable component 64.

In the foregoing two embodiments of the focusing motor 6, a cross section of an inner wall of the tubular structure may be a circle, a rectangle, or another regular shape; a cross section of an outer wall of the tubular structure may be a circle, a rectangle, or another regular shape; a cross section of an inner wall of the frame structure may be a circle, a rectangle, or another regular shape; and a cross section of an outer wall of the frame structure may be a circle, a rectangle, or another regular shape.

In the foregoing implementations, the compensation displacement compensates for displacement of the lens assembly during shaking, the shaking of the lens assembly is usually left-right shaking, and the compensation displacement is also located in a plane roughly perpendicular to the optical axis of the lens assembly. The plane roughly perpendicular to the optical axis is a plane whose included angle with the optical axis is a right angle, an acute angle less than 45 degrees, or an obtuse angle greater than 135 degrees. The compensation displacement is usually displacement in a direction roughly perpendicular to the optical axis of the lens assembly. The being roughly perpendicular means that an included angle between a straight line in which the displacement direction is located and a straight line in which the optical axis is located is a right angle, an acute angle less than 45 degrees, or an obtuse angle greater than 135 degrees.

In the foregoing embodiments, the "non-movably connected" means that no relative displacement occurs after two components are connected. The "movably connected" means that relative displacement may occur within a specific range after two components are connected. For example, one component is provided with a guide rail, the other component is provided with a sliding slot, the two components are connected by using the guide rail and the sliding slot, and the component provided with the sliding slot may slide along the guide rail.

Figure 7:
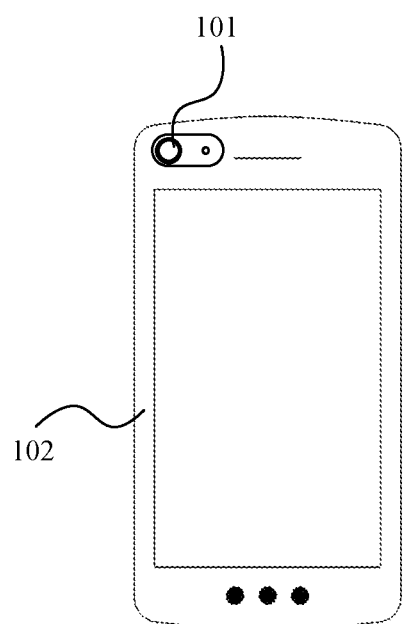
FIG. 7 is a schematic structural diagram of an embodiment of user equipment according to this application.

Referring to FIG. 7, this application further provides an embodiment of user equipment 100. The user equipment 100 includes a processor, a housing 102, and the camera assembly 101 in the foregoing embodiments. The processor is located inside the housing 102, and the camera assembly is assembled on an inner side of the housing 102. The processor is configured to send a control signal to the camera assembly. The camera assembly 101 may be non-movably or movably connected to a side wall of the housing 102. When the camera assembly 101 is non-movably connected to the side wall of the housing 102, a light hole is provided in front of the camera assembly 101 on the housing 102, and the camera assembly 101 collects light through the light hole. When the camera assembly 101 is movably connected to the side wall of the housing 102, the camera assembly 101 is assembled on the inner side of the housing 102 by using a scalable structure, and when photographing needs to be performed, the scalable structure pushes the camera assembly 101 outside the housing 102.

The camera assembly 101 is electrically connected to the processor. A control signal and data may be transmitted between the processor and the camera assembly 101. The processor may control the camera assembly 101 to perform a photographing operation, and a picture photographed by the camera assembly 101 may be transmitted to the processor 1010.

In an embodiment of the user equipment, a circuit board on which an image sensor in the camera assembly 101 is located and a circuit board on which the processor is located may be different circuit boards. For example, the processor may be located on a primary circuit board, and the circuit board on which the image sensor in the camera assembly is located is electrically connected to the primary circuit board by using a conducting wire.

The user equipment may be a wearable device, an in-vehicle terminal, a personal mobile terminal, a personal computer, a multimedia player, an electronic reader, a smart home device, a robot, or the like. The personal mobile terminal may also be a smartphone, a tablet computer, or the like. The wearable device may also be a smart band, a smart medical device, a head-mounted terminal, or the like. The head-mounted terminal device may be a virtual reality terminal, an augmented reality terminal, or the like, for example, Google Glass. The smart medical device may be a smart blood pressure measurement device, a smart blood glucose measurement device, or the like. The smart home device may be a smart access control system or the like. The robot may be any other electronic device with a photographing or video recording function, or the like.

Figure 8:
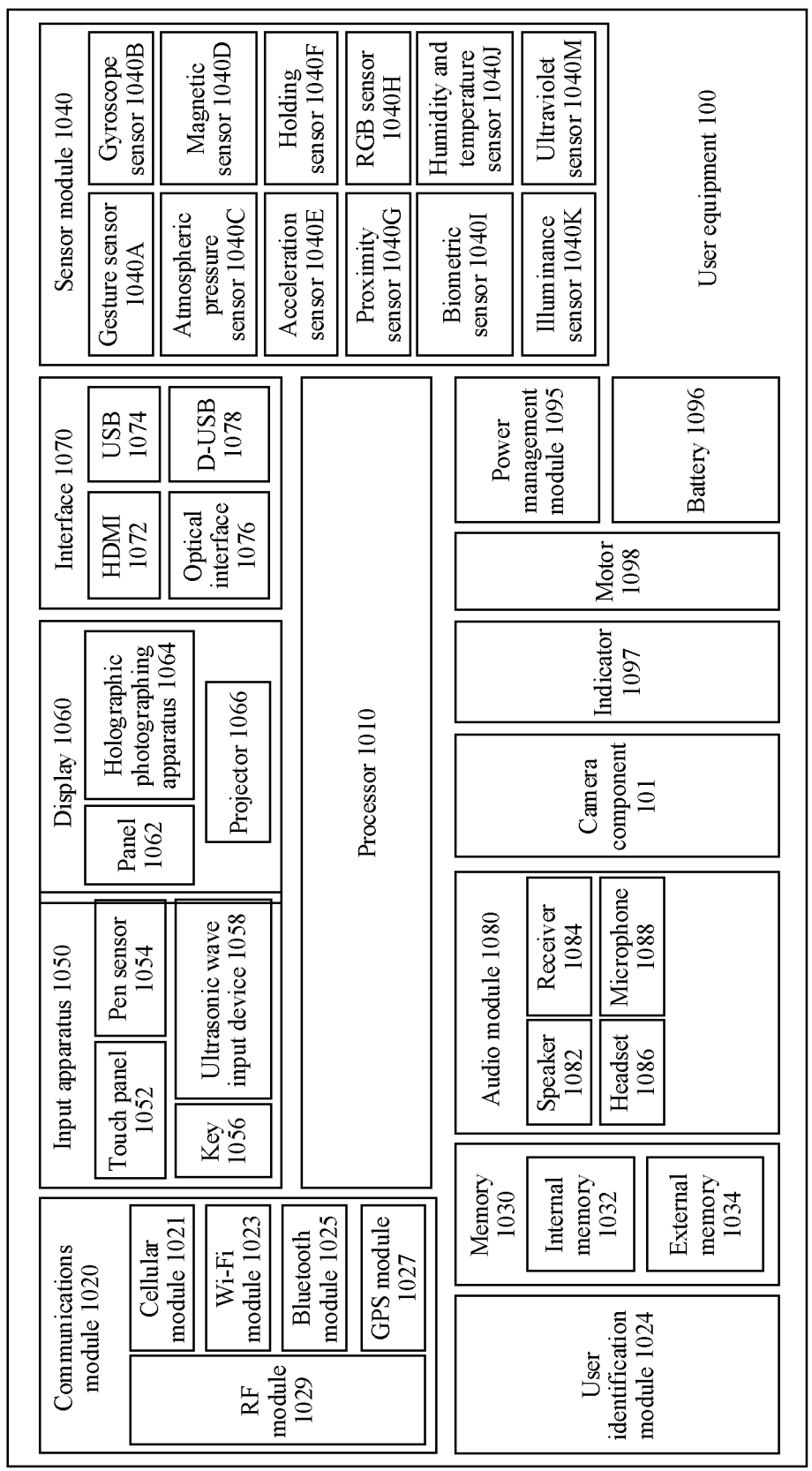
FIG. 8 is a schematic diagram of components included in an embodiment of user equipment according to this application.

As shown in FIG. 8, in addition to the processor 1010, components shown in FIG. 8 may be further included inside the housing of the user equipment 100. It should be noted that the components shown in FIG. 8 are not mandatory for the user equipment, and may be adjusted based on a function supported by the user equipment 100. For example, if the user equipment needs to support more functions, more components need to be mounted. If the user equipment supports a few functions, and some components shown in FIG. 8 are irrelevant to the functions supported by the user equipment, these components may not be disposed. In addition, some components in FIG. 8 may be combined. For example, some modules in a communications module 1020 may be combined with the processor 1010 into one component. Some components in FIG. 8 may be disposed separately. For example, a holographic photographing apparatus 1064 in a display 1060 may be disposed independent of the display 1060.

The user equipment 1001 shown in FIG. 8 includes the communications module 1020, a subscriber identity module 1024, a memory 1030, a sensor module 1040, an input apparatus 1050, the display 1060, an interface 1070, an audio module 1080, a camera assembly 101, a power management module 1095, a battery 1096, an indicator 1097, a motor 1098, and the processor 1010.

Functions of the processor 1010 are generally divided into three aspects. A first aspect is running an operating system. A second aspect is processing various types of data, for example, processing various types of data received from the communications module 1020 or the input apparatus 1050, and sending processed data by using the communications module 1020, or displaying processed data by using the display. A third aspect is running an application program and controlling a plurality of pieces of hardware connected to the processor 1010 to perform corresponding functions. For example, the camera assembly 101 is controlled to provide a photographing function for a user.

The processor 1010 may have one or more of the functions in the foregoing three aspects, and may be split into one or more processors based on different functions, for example, a graphics processing unit (GPU), an image signal processor (ISP), a central processing unit (CPU), an application processor (AP), or a communication processor (CP). A processor that is obtained through splitting and that has an independent function may be disposed on another associated module. For example, the communications processor (CP) may be disposed with a cellular module 1021.

In terms of hardware, the processor 1010 may include one or more IC chips.

The processor may be an integrated circuit that operates according to a non-solidified instruction or an integrated circuit that operates according to a solidified instruction. A processor that operates according to a non-solidified instruction implements functions carried on the processor by reading and executing an instruction in the internal memory 1032. A processor that operates according to a solidified instruction implements functions carried on the processor by executing its own hardware logic circuit. When executing its own hardware logic circuit, the processor that operates according to a solidified instruction usually also needs to read some data from the internal memory 1032 or output an execution result to the internal memory 1032.

The memory 1030 includes the internal memory 1032, and may further include an external memory 1034. The internal memory 1032 may include one or more of the following: a volatile memory (for example, a dynamic random access memory (DRAM), a static random access memory (SRAM), or a synchronous dynamic random access memory (SDRAM)), a nonvolatile memory (for example, a one time programmable read only memory (OTPROM), a programmable read only memory (PROM), an erasable programmable read-only memory (EPROM), an electrically erasable programmable read-only memory (EEPROM), a mask read-only memory, a flash read-only memory, or a flash memory (for example, a NAND flash memory or a NOR flash memory)), a hard disk drive, or a solid state disk (SSD).

The external memory 1034 may include a flash memory drive, for example, a compact flash (CF), a secure digital card (SD card), a micro SD (Secure Digital) card, a mini SD (Secure Digital) card, an extreme digital-picture card (xD card), a multimedia card (MMC), or a memory stick.

The communications module 1020 may include a cellular module 1021, a Wi-Fi (wireless fidelity) module 1023, a Bluetooth (BT) module 1025, a GPS (Global Positioning System) module 1027, an NFC (Near Field Communication) module 1028, and a radio frequency (RF) module 1029. The cellular module 1021 may provide, for example, a voice call service, a video call service, a text message service, or an Internet service through a communications network.

The radio frequency module 1029 is configured to send/receive a communication signal (for example, an RF signal). The radio frequency module 1029 may include a transceiver, a power amplifier module (PAM), a frequency filter, a low-noise amplifier (LNA), an antenna, or the like.

The subscriber identity module 1024 is configured to store unique identification information (for example, an integrated circuit card identifier (ICCID) or user information (for example, an international mobile subscriber identification number (IMSI)). The subscriber identity module 1024 may include an embedded SIM (Subscriber Identity Module) card or the like.

The sensor module 1040 is configured to detect a status of the user equipment 1001 and/or measure a physical quantity. The sensor module 1040 may include one or more of a gesture sensor 1040A, a gyroscope sensor 1040B, an atmospheric pressure sensor 1040C, a magnetic sensor 1040D, an acceleration sensor 1040E, a holding sensor 1040F, a proximity sensor 1040G, a color sensor 1040H (for example, a red/green/blue (RGB) sensor), a biosensor 1040I, a temperature/humidity sensor 1040J, an illumination sensor 1040K, an ultraviolet (UV) sensor 1040M, an olfaction sensor (an electronic nose sensor), an electromyography (EMG) sensor, an electroencephalogram (EEG) sensor, an electrocardiogram (ECG) sensor, an infrared (IR) sensor, an iris recognition sensor, and a fingerprint sensor.

The input apparatus 1050 may include one or more of a touch panel 1052, a (digital) stylus sensor 1054, a key 1056, and an ultrasonic wave input apparatus 1058. The (digital) stylus sensor 1054 may be disposed independently, or may serve as a part of the touch panel 1052. The key 1056 may include one or more of a physical button, an optical button, and a keyboard. The ultrasonic wave input apparatus 1058 is configured to sense an ultrasonic wave generated by a microphone 1088 or another input tool.

The display 1060 (or referred to as a screen) is configured to present various types of content (for example, a text, an image, a video, an icon, a symbol, or a similar object) to a user. The display 1060 may include a panel 1062 or a touchscreen, and the panel 1062 may be rigid, flexible, transparent, or wearable. The display 1060 may further include the holographic photographing apparatus 1064 or a projector 1066, and may be further configured to receive an indication signal, such as a touch, a gesture, proximity, or hover, that is input from an electronic stylus or a part of a user's body.

The panel 1062 may be integrated with the touch panel 1052. The holographic photographing apparatus 1064 is configured to display a 3D image in space by using an optical interference phenomenon. The projector 1066 is configured to project light onto the display 1060 to display an image.

The interface 1070 may include an HDMI (High Definition Multimedia Interface) 1072, a USB (Universal Serial Bus) interface 1074, an optical interface 1076, a D-subminiature (Dsub) interface 1078, a mobile high-definition link (MHL) interface, an SD card/multimedia card (MMC) interface, an infrared data association (IrDA) interface, or the like.

The audio module 1080 is used to convert sound into an electrical signal or convert an electrical signal into sound. The audio module 1080 may process sound information that is input or output through a speaker 1082, a receiver 1084, an earphone 1086, or the microphone 1088.

The power management module 1095 is configured to manage power supply for other modules in the user equipment 1001. The indicator 1097 is configured to display a status of the user equipment 1001 or a status of each component in the user equipment 1001, for example, a startup status, a message status, or a charging status.

The motor 1098 is configured to drive one or more components in the user equipment 1001 to perform mechanical movement.

The term "and/or" describes an association relationship for describing associated objects and represents that at least three relationships may exist. For example, A and/or B may represent the following three cases: Only A exists, both A and B exist, and only B exists. The character "/" generally indicates an "or" relationship between the associated objects. "At least one of the following" or a similar expression thereof indicates "any combination of the following", and includes "any combination of one or more of the following". For example, at least one of a, b, or c may indicate: a, b, c, a-b, a-c, b-c, or a-b-c, where a, b, and c may be singular or plural.

In the descriptions of this application, it should be understood that directions or location relationships indicated by the terms such as "center", "up", "down", "front", "rear", "left", "right", "vertical", "horizontal", "top", "bottom", "inside", and "outside" are based on the directions or the location relationships shown in the accompanying drawings, and are merely intended to describe this application and simplify the descriptions, but not intended to indicate or imply that an indicated apparatus or component shall have a specific direction or be formed and operated in a specific direction, and therefore cannot be understood as a limitation on this application.

The terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features.

The invention claimed is:

1. A camera assembly, comprising:
an optical image stabilization motor;
a focusing motor;
a housing; and
a lens assembly, wherein:
the optical image stabilization motor, the focusing motor and the lens assembly are located inside the housing, a through hole is provided at an end of the housing, the lens assembly is configured to collect light through the through hole;
the optical image stabilization motor is located on an inner side at the end of the housing and at which the through hole is provided, the optical image stabilization motor being configured to drive the lens assembly to perform compensation displacement, the optical image stabilization motor comprising a non-movable image stabilization component, a movable image stabilization component, and a drive wire connected between the non-movable image stabilization component and the movable image stabilization component, the non-movable image stabilization component is connected to the inner side at the end that is of the housing and at which the through hole is provided, the drive wire is configured to drive the movable image stabilization component to perform compensation displacement, and the movable image stabilization component is configured to drive the lens assembly to perform compensation displacement; and
the focusing motor is configured to drive the lens assembly to move to implement focusing, the focusing motor being located between a circuit board and the optical image stabilization motor, on an imaging side of the lens assembly.

2. The camera assembly according to claim 1, wherein the housing comprises an end plate and a side plate connected to an edge of the end plate, the side plate of the housing is located in space around the focusing motor, and the through hole is provided on the end plate, and the non-movable image stabilization component of the optical image stabilization motor is non-movably connected to an inner side wall of the end plate, or the non-movable image stabilization component of the optical image stabilization motor is non-movably connected to an inner side wall at an end that is of the side plate and near the end plate.

3. The camera assembly according to claim 2, wherein the focusing motor comprises a non-movable focusing component, a movable focusing component, and a drive component, wherein the movable focusing component of the focusing motor is assembled with the lens assembly, or the movable focusing component of the focusing motor is integrated with a lens holder of the lens assembly, the non-movable focusing component of the focusing motor is disposed on an outer side of the movable focusing component, the drive component is disposed between the non-movable focusing component and the movable focusing component of the focusing motor, and the drive component is configured to drive the movable focusing component to move, relative to the non-movable focusing component, along a direction of an optical axis or along a direction parallel to the optical axis, the non-movable focusing component of the focusing motor is non-movably connected to the movable image stabilization component of the optical image stabilization motor, or the non-movable focusing component of the focusing motor is integrated with the movable image stabilization component of the optical image stabilization motor, and the movable image stabilization component of the optical image stabilization motor is movably connected to the movable focusing component of the focusing motor.

4. The camera assembly according to claim 3, wherein the movable image stabilization component and the non-movable image stabilization component of the optical image stabilization motor each are disposed as a plate structure with a via, and are stacked; an end that is of the non-movable focusing component of the focusing motor and that faces the end plate of the housing is non-movably connected to the movable image stabilization component of the optical image stabilization motor; and an end that is of the movable focusing component of the focusing motor and that faces the end plate of the housing is movably connected to the movable image stabilization component of the optical image stabilization motor.

5. The camera assembly according to claim 1, wherein the housing comprises an end plate and a side plate connected to an edge of the end plate, and the through hole is provided on the end plate; and
the non-movable image stabilization component of the optical image stabilization motor is movably connected to an inner side wall of the end plate, or the non-movable image stabilization component of the optical image stabilization motor is movably connected to an inner side wall at an end that is of the side plate and that is near the end plate.

6. The camera assembly according to claim 5, wherein the focusing motor comprises a first movable component, a second movable component, and a drive component;
the second movable component of the focusing motor is disposed in space around the lens assembly, and is assembled with a lens holder of the lens assembly, or the second movable component of the focusing motor is integrated with a lens holder of the lens assembly;
the first movable component of the focusing motor is disposed on an outer side of the second movable component, and the drive component of the focusing motor is disposed between the side plate of the housing and the focusing motor, and is configured to drive the focusing motor and the lens assembly to move, relative to the side plate, along a direction of an optical axis or along a direction parallel to the optical axis;

the first movable component of the focusing motor is non-movably connected to the non-movable image stabilization component of the optical image stabilization motor, or the first movable component is integrated with the non-movable image stabilization component of the optical image stabilization motor; and the movable image stabilization component of the optical image stabilization motor is non-movably connected to the second movable component of the focusing motor, or the movable image stabilization component of the optical image stabilization motor is integrated with the second movable component of the focusing motor.

7. The camera assembly according to claim 6, wherein the movable image stabilization component and the non-movable image stabilization component of the optical image stabilization motor each are disposed as a plate structure with a via, and are stacked;

the non-movable image stabilization component is movably connected to the inner side wall of the end plate of the housing, or the non-movable image stabilization component is movably connected to the inner side wall at the end that is of the side plate of the housing and that is near the end plate; and an edge of the non-movable image stabilization component stacked on the movable image stabilization component protrudes out of an edge of the movable image stabilization component, an end that is of the first movable component of the focusing motor and that faces the end plate of the housing is non-movably connected to an edge part that is of the non-movable image stabilization component and that protrudes out of the movable image stabilization component, an end that is of the second movable component of the focusing motor and that faces the end plate of the housing is movably connected to the movable image stabilization component, the movable image stabilization component is configured to drive the second movable component of the focusing motor to move, to perform compensation displacement, and correspondingly, the second movable component of the focusing motor is configured to drive the lens assembly to move, to perform compensation displacement.

8. The camera assembly according to claim 1, wherein the housing comprises an end plate and a side plate connected to an edge of the end plate, the side plate of the housing is located in space around the focusing motor, the through hole is provided on the end plate, a first lead is connected between the drive wire of the optical image stabilization motor and the circuit board, and the first lead is connected to the circuit board along an outer side of the side plate of the housing.

9. The camera assembly according to claim 8, wherein a location at which the first lead is electrically connected to the circuit board is a location far away from pins of an image sensor of the circuit board, and the image sensor is configured to collect light passing through the lens assembly and form an image.

10. The camera assembly according to claim 9, wherein at least a part of the circuit board is located on an outer side of the side plate, the location at which the first lead is connected to the circuit board is on an outer side of the side plate of the housing, a magnetic shielding material film is attached to an inner side wall that is of the side plate of the housing and that is near the first lead, and the magnetic shielding material film is configured to shield electromagnetic radiation of an electrical signal in the first lead.

11. The camera assembly according to claim 1, wherein the housing comprises an end plate and a side plate connected to an edge of the end plate, the side plate of the housing is located in space around the focusing motor, the through hole is provided on the end plate, a second lead is connected between the focusing motor and the circuit board, and the second lead is connected from an outer side of the side plate of the housing to the circuit board.

12. The camera assembly according to claim 11, wherein a location at which the second lead is electrically connected to the circuit board is a location far away from pins of an image sensor of the circuit board, and the image sensor is configured to collect light passing through the lens assembly and form an image.

13. The camera assembly according to claim 12, wherein at least a part of the circuit board is located on an outer side of the side plate, the location at which the second lead is connected to the circuit board is also on an outer side of the side plate of the housing, a magnetic shielding material film is attached to an inner side wall that is of the side plate of the housing and that is near the second lead, and the magnetic shielding material film is configured to shield electromagnetic radiation of an electrical signal in the second lead.

14. User equipment, comprising:
a processor;
a user equipment housing; and
a camera assembly, comprising:
an optical image stabilization motor;
a focusing motor;
a camera assembly housing; and
a lens assembly, wherein:
the optical image stabilization motor and the lens assembly are located inside the camera assembly housing, a through hole is provided at an end of the camera assembly housing to collect light through the through hole, the optical image stabilization motor is located on an inner side at the end of the camera assembly housing and at which the through hole is provided, the optical image stabilization motor is configured to drive the lens assembly to perform compensation displacement to compensate for displacement that occurs when the lens assembly is shaken; the processor is located inside the housing, the camera assembly is assembled on an inner side of the housing, and the processor is configured to send a control signal to the camera assembly, the optical image stabilization motor comprising a non-movable image stabilization component, a movable image stabilization component, and a drive wire connected between the non-movable image stabilization component and the movable image stabilization component; the non-movable image stabilization component is connected to the inner side at the end that is of the housing and at which the through hole is provided; the drive wire is configured to drive the movable image stabilization component to perform compensation displacement; and the movable image stabilization component is configured to drive the lens assembly to perform compensation displacement; and
the focusing motor is configured to drive the lens assembly to move to implement focusing, the focusing motor is located inside the housing and is located between a circuit board and the optical image stabilization motor, and the circuit board is located on an imaging side of the lens assembly.

15. The user equipment according to claim 14, wherein the housing comprises an end plate and a side plate connected to an edge of the end plate, the side plate of the housing is located in space around the focusing motor, and the through hole is provided on the end plate; and the non-movable image stabilization component of the optical image stabilization motor is non-movably connected to an inner side wall of the end plate, or the non-movable image stabilization component of the optical image stabilization motor is non-movably connected to an inner side wall at an end that is of the side plate and that is near the end plate.

16. The user equipment according to claim 15, wherein the focusing motor comprises a non-movable focusing component, a movable focusing component, and a drive component, wherein the movable focusing component of the focusing motor is assembled with the lens assembly, or the movable focusing component of the focusing motor is integrated with a lens holder of the lens assembly; the non-movable focusing component of the focusing motor is disposed on an outer side of the movable focusing component, the drive component is disposed between the non-movable focusing component and the movable focusing component of the focusing motor, and the drive component is configured to drive the movable focusing component to move, relative to the non-movable focusing component, along a direction of an optical axis or along a direction parallel to the optical axis; the non-movable focusing component of the focusing motor is non-movably connected to the movable image stabilization component of the optical image stabilization motor, or the non-movable focusing component of the focusing motor is integrated with the movable image stabilization component of the optical image stabilization motor; and the movable image stabilization component of the optical image stabilization motor is movably connected to the movable focusing component of the focusing motor.

17. The user equipment according to claim 16, wherein the movable image stabilization component and the non-movable image stabilization component of the optical image stabilization motor each are disposed as a plate structure with a via, and are stacked; an end that is of the non-movable focusing component of the focusing motor and that faces the end plate of the housing is non-movably connected to the movable image stabilization component of the optical image stabilization motor; and an end that is of the movable focusing component of the focusing motor and that faces the end plate of the housing is movably connected to the movable image stabilization component of the optical image stabilization motor.

18. The user equipment according to claim 14, wherein the housing comprises an end plate and a side plate connected to an edge of the end plate, and the through hole is provided on the end plate; and the non-movable image stabilization component of the optical image stabilization motor is movably connected to an inner side wall of the end plate, or the non-movable image stabilization component of the optical image stabilization motor is movably connected to an inner side wall at an end that is of the side plate and that is near the end plate.

19. The user equipment according to claim 18, wherein the focusing motor comprises a first movable component, a second movable component, and a drive component, the second movable component of the focusing motor is disposed in space around the lens assembly, and is assembled with a lens holder of the lens assembly, or the second movable component of the focusing motor is integrated with a lens holder of the lens assembly, the first movable component of the focusing motor is disposed on an outer side of the second movable component, and the drive component of the focusing motor is disposed between the side plate of the housing and the focusing motor, and is configured to drive the focusing motor and the lens assembly to move, relative to the side plate, along a direction of an optical axis or along a direction parallel to the optical axis; the first movable component of the focusing motor is non-movably connected to the non-movable image stabilization component of the optical image stabilization motor, or the first movable component is integrated with the non-movable image stabilization component of the optical image stabilization motor; and the movable image stabilization component of the optical image stabilization motor is non-movably connected to the second movable component of the focusing motor, or the movable image stabilization component of the optical image stabilization motor is integrated with the second movable component of the focusing motor.

20. The user equipment according to claim 19, wherein the movable image stabilization component and the non-movable image stabilization component of the optical image stabilization motor each are disposed as a plate structure with a via, and are stacked; the non-movable image stabilization component is movably connected to the inner side wall of the end plate of the housing, or the non-movable image stabilization component is movably connected to the inner side wall at the end that is of the side plate of the housing and that is near the end plate; and an edge of the non-movable image stabilization component stacked on the movable image stabilization component protrudes out of an edge of the movable image stabilization component, an end that is of the first movable component of the focusing motor and that faces the end plate of the housing is non-movably connected to an edge part that is of the non-movable image stabilization component and that protrudes out of the movable image stabilization component, an end that is of the second movable component of the focusing motor and that faces the end plate of the housing is movably connected to the movable image stabilization component, the movable image stabilization component is configured to drive the second movable component of the focusing motor to move, to perform compensation displacement, and correspondingly, the second movable component of the focusing motor is configured to drive the lens assembly to move, to perform compensation displacement.

21. The user equipment according to claim 14, wherein the housing comprises an end plate and a side plate connected to an edge of the end plate, the side plate of the housing is located in space around the focusing motor, the through hole is provided on the end plate, a first lead is connected between the drive wire of the optical image stabilization motor and the circuit board, and the first lead is connected to the circuit board along an outer side of the side plate of the housing.

22. The user equipment according to claim 21, wherein a location at which the first lead is electrically connected to the circuit board is a location far away from pins of an image sensor of the circuit board, and the image sensor is configured to collect light passing through the lens assembly and form an image.

23. The user equipment according to claim 22, wherein at least a part of the circuit board is located on an outer side of the side plate, the location at which the first lead is connected to the circuit board is on an outer side of the side plate of the housing, a magnetic shielding material film is attached to an inner side wall that is of the side plate of the housing and that is near the first lead, and the magnetic shielding material film is configured to shield electromagnetic radiation of an electrical signal in the first lead.

24. The user equipment according to claim 14, wherein the housing comprises an end plate and a side plate connected to an edge of the end plate, the side plate of the housing is located in space around the focusing motor, the through hole is provided on the end plate, a second lead is connected between the focusing motor and the circuit board, and the second lead is connected from an outer side of the side plate of the housing to the circuit board.

25. The user equipment according to claim 24, wherein a location at which the second lead is electrically connected to the circuit board is a location far away from pins of an image sensor of the circuit board, and the image sensor is configured to collect light passing through the lens assembly and form an image.

26. The user equipment according to claim 25, wherein at least a part of the circuit board is located on an outer side of the side plate, the location at which the second lead is connected to the circuit board is also on an outer side of the side plate of the housing, a magnetic shielding material film is attached to an inner side wall that is of the side plate of the housing and that is near the second lead, and the magnetic shielding material film is configured to shield electromagnetic radiation of an electrical signal in the second lead.

* * * * *